United States Patent [19]

Yamaguchi

[11] Patent Number: 4,773,203
[45] Date of Patent: Sep. 27, 1988

[54] APPARATUS AND PROCESS FOR STRIPPING A NET FROM MEAT

[75] Inventor: Toshihiko Yamaguchi, Tokyo, Japan

[73] Assignee: Chuo Kogyo Co., Ltd, Tokyo, Japan

[21] Appl. No.: 59,799

[22] Filed: Jun. 9, 1987

[30] Foreign Application Priority Data

Jan. 21, 1987 [JP] Japan ................. 62-5992[U]

[51] Int. Cl.⁴ ............. B65B 41/04; B23P 19/00
[52] U.S. Cl. ................. 53/492; 53/381 R;
29/426.3; 17/49; 426/389; 414/16
[58] Field of Search ............. 53/381 R, 492;
29/426.3; 414/403, 416, 417, 786; 426/389;
17/49

[56] References Cited

U.S. PATENT DOCUMENTS

| | | | |
|---|---|---|---|
| 3,727,364 | 4/1973 | Wiking | 53/492 |
| 3,889,442 | 6/1975 | Grahn et al. | 53/381 R X |
| 4,158,417 | 6/1979 | Inoue | 53/381 R X |
| 4,457,123 | 7/1984 | Hoehn | 53/381 R |
| 4,680,850 | 7/1987 | Boucherie | 53/492 X |

FOREIGN PATENT DOCUMENTS 62-30583 2/1987 Japan .

Primary Examiner—Horace M. Culver
Attorney, Agent, or Firm—Sandler & Greenblum

[57] ABSTRACT

An apparatus and method for stripping a meat net from a process meat product. The apparatus includes a base which is adapted to support at least one inner tube and one outer tube, with the inner tube including a container for secondarily processed meat goods. The outer tube is attached to the base body and is provided with a device for engaging an open end portion of the meat net. The inner tube is movably (and slideably) mounted within the outer tube so that it can be moved forwardly to the exterior of the base and the outer tube, and rearwardly back into a position within the outer tube.

29 Claims, 3 Drawing Sheets

F I G . 1
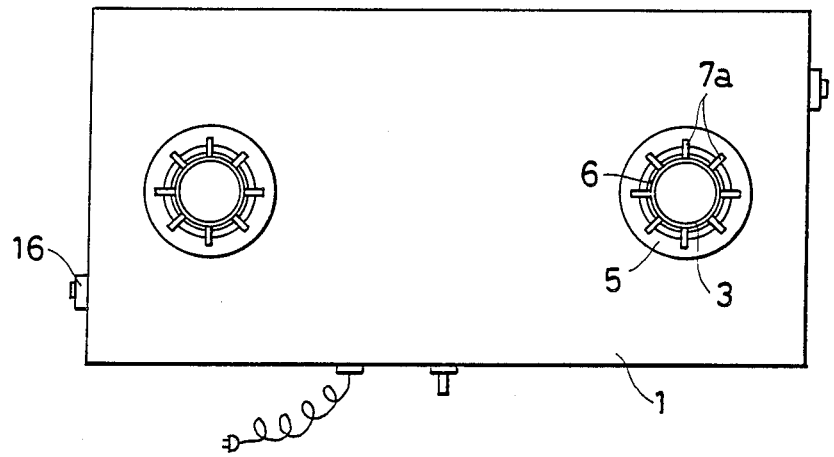
F I G . 3
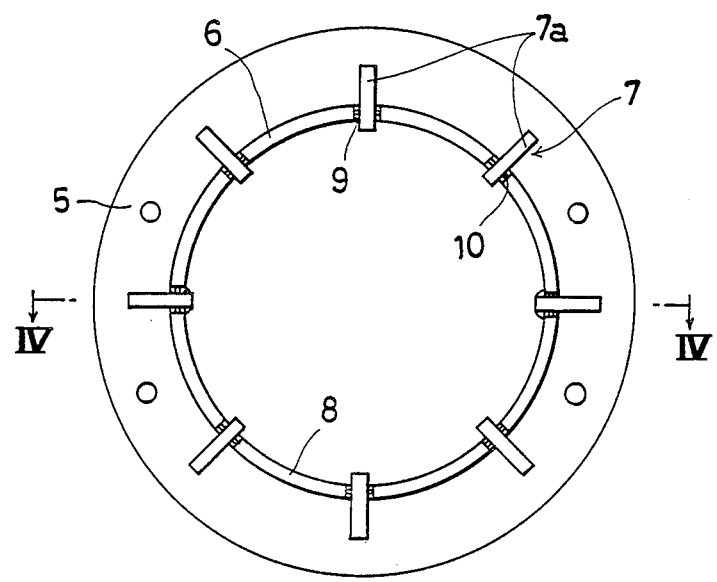

APPARATUS AND PROCESS FOR STRIPPING A NET FROM MEAT

BACKGROUND OF THE INVENTION

1. Field of the Invention

The present invention generally relates to an apparatus for stripping a net from meat, e.g., from secondary processed meat goods such as ham, sausage, or similar meats.

2. Discussion of Relevant Information

It has been conventional to manually strip a net from secondary processed meat goods, e.g., ham, sausage, or the like, which are produced by applying a net to the meat.

As a result, inconveniences have arisen from the fact that the manual net stripping operation takes an undue amount of time and is extremely troublesome; and that the stripping force provided by the hands of a worker are not constant. As a result, pieces of meat are likely to adhere to the meat net, and the appearance of resultant product is often spoiled with a plurality of dimples. As a result, its quality (and therefore its value) are reduced.

SUMMARY OF THE INVENTION

One object of the present invention is to provide an apparatus which is free from the above-noted inconveniences and disadvantages; this apparatus includes a base body having at least one pair of tubes, i.e., an inner tube and an outer tube, with the inner tube being suitable for containing a secondarily processed meat produce covered by a net. The outer tube is fixedly attached to the base body and is provided along its own outer circumferential opening edge with an engaging assembly which is adapted to engage an open end of the meat net. The inner tube is mounted within the outer tube so as to be movable forwardly, outwardly of the outer circumferential opening edge of the outer tube, and rearwardly, i.e., within the outer circumferential opening edge of the outer tube.

In a first aspect thereof, the present invention is directed to an apparatus for stripping a meat net away from a packaged meat product surrounded by the net having a base body having at least one inner tube and at least one outer tube positioned thereon. The inner tube includes means for retaining a processed meat product covered by the meat net and the outer tube is attached to the base body and includes an outer circumferential open edge which has means for selectively engaging an open end portion of the net. The inner tube is mounted within the outer tube and is movable outwardly and inwardly with respect to the outer tube through the outer edge of the outer tube.

A related aspect of the present invention, as described above, is the provision of a meat net engaging means which includes a plurality of claw members attached to the outer circumferential opening edge of the outer tube arranged radially with respect to the opening edge, preferably wherein each of the claw members include a base end mounted within generally radially directed recesses in an annular cover attached to the outer tube edge and wherein each of the claw members are swingably supported on an annular engaging pin which is retained within the annular cover, and further includes means for selectively contacting the base end of each of the claw members with an outer circumferential surface of the inner tube when the inner tube is moved outwardly from the outer tube.

Another related aspect of the present invention, as described above, is the provision of a meat net engaging means having a flange on the outer circumferential opening edge of the outer tube and a band which is detachably mounted about the flange and which includes means for fastening one end of the meat net to the flange.

Another aspect of the present invention is directed to an apparatus for stripping a net away from a meat product covered by the net which includes a base support having a plurality of walls; at least one pair of concentric tubes attached to the walls including an inner tube and an outer tube; and means for engaging one end of the net attached to a peripheral portion of the outer tube, wherein the outer tube has a first and second open ends and a cap attached to the first open end of the outer tube, wherein the cap includes a plurality of radially arranged recesses, and a plurality of claws are positioned in the plurality of recesses.

A related aspect of the present invention, as described above, is the provision of a cap which includes spaced apart, generally annular outer and inner wall portions between which an annular ring is positioned with between the inner and outer portions, each of the claws being pivotably positioned on the annular ring, and including a slot which is adapted to be slidably supported on the annular ring, preferably wherein each of the claw members includes a base portion which is adapted to selectively contact an outer surface of the inner tube when the inner tube is moved outwardly through the first end of the outer tube, and extend radially outwardly from respective recesses.

Another related aspect of the present invention, as described above, is the provision of an inner tube which is longer than the outer tube and is slidably positioned within the outer tube, wherein the inner tube has an open first end and a closed second end, and the inner and outer tubes are positioned vertically within an aperture in an upper wall of the base support, preferably wherein the outer tube has an outer peripheral portion and wherein a flange is positioned in a substantially horizontal fashion about the outer peripheral portion, the flange being adapted to rest on an upper surface of the base support, which includes a plurality of casters attached to its bottom wall.

Another related aspect of the present invention, as described above, is that the engaging means include a plurality of pivotable claws attached to one end of the outer tube, and the inner tube include an outer circumferential surface which has means for limiting pivotable movement of the claws, wherein the inner tube has first and second ends, the second end being closed, and the apparatus further including a cylinder attached to the closed end of the inner tube and having means for slidably driving the inner tube within the outer tube, and preferably also includes an electromagnetic changeover valve for operating the cylinder, and a changeover switch for operating the electromagnetic valve, preferably wherein the outer tube include a first open end and a second open end, and the apparatus also includes an elastic band which is adapted to be positioned over an outer flange on the outer tube and has means for engaging a portion of the meat net positioned over the flange.

A further aspect of the present invention relates to a method of stripping a net from a secondary meat product surrounded by a net, which involves positioning a meat product surrounded by the net within a first, inner tube having one closed end for supporting the meat product and the net; attaching a first end of the meat net to an engaging device on an open end of a second, exterior tube within which the inner tube is slidably positioned; and moving the inner tube through the outer tube while retaining the first end of the meat net with the engaging means, which preferably also involves pushing the inner tube, preferably using a cylinder, through the outer tube until the net is at least substantially separated from the meat products, preferably wherein the inner tube is pushed completely through the outer tube, followed by removing the meat product from the net, and returning the inner tube to a position within the exterior tube for receiving a second meat product wrapped within a net.

BRIEF DESCRIPTION OF THE DRAWINGS

The above-noted objects, features, and advantages of the present invention will be more fully described with respect to the accompanying drawings, in which like reference numerals represent similar parts throughout the several views, and wherein:

FIG. 1 is a top plan view of a stripping apparatus formed in accordance with the present invention;

FIG. 3 is a top plan view of an outer tube forming a portion of the apparatus of FIG. 1;

DETAILED DESCRIPTION OF THE DRAWINGS

Figure 6:
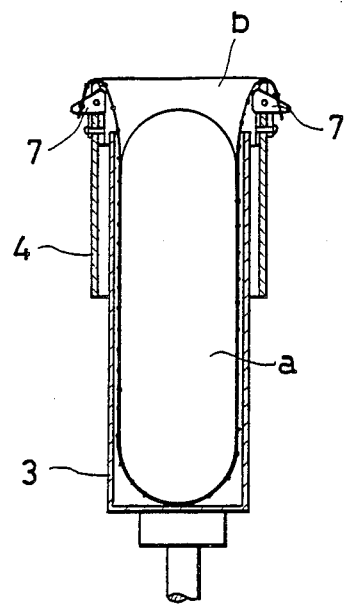
FIG. 6 is a first sectional view illustrating the operation of the present apparatus in stripping a net from meat.
Figure 7:
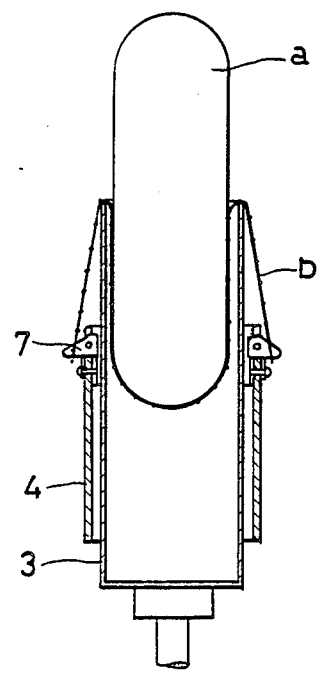
FIG. 7 is a second, advanced sectional view illustrating the operation of the apparatus at a later stage than that illustrated in FIG. 6.

Referring more specifically to the drawings, a base body 1 is provided which is formed, in the example illustrated, in a box-like configuration as a working bench which has a bottom panel provided with one or more casters 2 to ensure that the base will be mobile. A pair of tubes, i.e., an inner tube 3 and an outer tube 4, are concentrically disposed in an inside-outside relationship so as to form a double tube pair. Inner tube 3 has a bottom and is adapted to contain a secondarily processed meat (a), e.g., ham, sausage, or the like, which is covered with a meat net (b) which is best illustrated in FIGS. 6 and 7. The double tubes 3 and 4 are provided on base body 1 so that they will extend vertically through a hole in the top panel of base body 1 such that flange 5, which protrudes horizontally from and about an outer circumferential surface of the middle portion of outer tube 4, will be attached to an outer surface of a top panel of base body 1.

Figure 4:
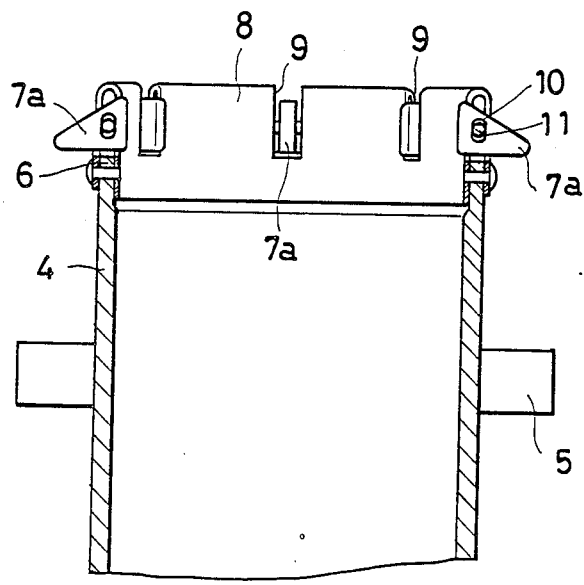
FIG. 4 is a sectional view taken along IV—IV of the apparatus of FIG. 3.
Figure 5:
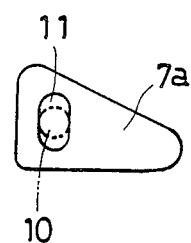
FIG. 5 is an enlarged front view of a claw member forming a portion of the present invention.

Outer tube 4 is provided, along its opening or upper edge 6 (see FIG. 4), with an engaging device 7 which is adapted to engage an opened end portion of meat net (b). The engaging device comprises, e.g., a plurality of claw members 7a which are radially attached to the outer circumferential peripheral opening edge 6 of outer tube 4. In greater detail, claw members 7a are mounted, at their base end portions, in respective recessed portions which are provided radially in an annular cover 8, which cover is fitted over the open edge 6 of outer tube 4. The annular cover has an inverted, substantially U-shaped cross section and is attached to a front (or top, as in FIG. 2) end of outer tube 4. The claw members are pivotally supported, via respective pivotal openings 11, on an annular engaging pin 10, which is held between spaced opposed walls of cover 8, such that claw members 7a can be swingably supported about pin 10 within respective recessed portions 9 to thereby engage and disengage meat net (b) such that the claw memberds can be easily engaged and disengaged from meat net (b).

Figure 2:
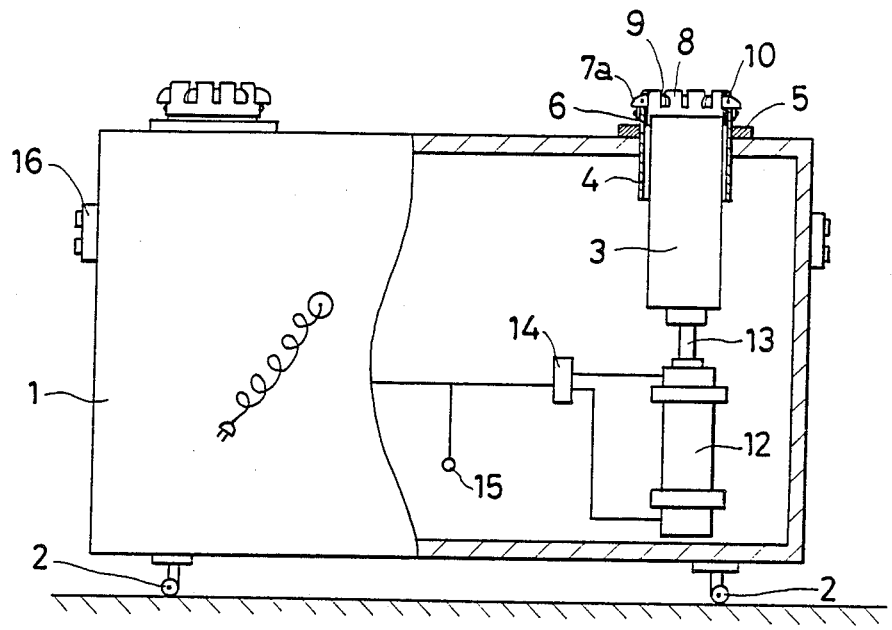
FIG. 2 is a partially cut-away front view of the apparatus of FIG. 1.

Additionally, claw members 7a are arranged such that when inner tube 3 is moved forwardly, i.e., upwardly in the example illustrated in FIG. 2, the base, i.e., inner, ends of the claw members are adapted to be brought into contact with a portion of outer circumferential surface of inner tube 3 such that claw members 7a can be prevented from swinging; and, as a result, meat net (b) will be prevented from coming off of the claw members 7a. Although the engagement between the outer periphery of tube 3 and the inner, generally vertical surface of each claw 7 is not clearly shown in the figures, such possible engagement nonetheless prevents the claws from pivoting when so engaged to any significant degree. In other words, only a small, generally annular clearance is provided between tube 3 and claws 7, thereby limiting pivoting of the claws.

By using the bottom panel of inner tube 3, rod 13 of operation cylinder 12 is attached to the bottom such that inner tube 3 can be mounted within outer tube 4 as to be movable, e.g., by operation of cylinder 12, forwardly outside of the outer tube and rearwardly within the outer circumferential opening edge 6 of outer tube 4. In other words, the inner tube is capable of protruding outwardly beyond opening edge 6 of outer tube 4 and retreating or being withdrawn back into outer tube 4.

An electromagnetic changeover valve 14 is provided for changeover cylinder 12. A connecting opening 15 for a pressure supply source is provided which is connected to operation cylinder 12, and a changeover switch 16 is provided for operating electromagnetic valve 14.

Engaging device 7 located on the outer circumferential opening edge 6 of outer tube 4 need not be limited to the type of claw member 7a which are illustrated, but can instead be modified, e.g., into a combination flange provided along the outer circumferential opening edge 6 of tube 4 and a band, e.g., a single touch type or elastic band, so that an end portion of meat net (b) can be applied so that it will extend over the flange; from above the tube, the elastic band will be elastically applied to bring the end portion of meat net (b) into engagement with the flange. In the example illustrated, a pair of inner and outer tubes 3 and 4 are installed in a substantially vertical position on base body 1. Alternately, the inner and outer tubes can be installed in a substantially horizontal position or in a substantially oblique position. Further, in the example illustrated, two pairs of inner tubes 3 and outer tubes 4 are provided on the left hand and right hand sides, respectively, of base body 1.

The operation of the apparatus which is illustrated will now be detailed.

A secondary processed meat good (a), which has been wrapped by meat net (b) is positioned within inner tube 3, and the open end portion of meat net (b) is brought into engagement with the outer portions of claw members 7a which are provided along the outer circumferential opening edge 6 of outer tube 4, as best illustrated in FIG. 6. In this condition, if inner tube 3 is moved upwardly so that it will protrude outwardly beyond opening edge 6 of outer tube 4, a radially outwardly extending region of meat net (b) is brought into contact with an opening edge of upwardly moving inner tube 3, and is moved upwardly; simultaneously, the secondarily processed meat goods (a) are pushed upwardly from behind (or underneath, as in FIGS. 6 and 7) from meat net (b) and outwardly through the opening edge 6 of outer tube 4. As a result, net (b) is generally stripped away from meat (a) at its contact regions with net (b), as illustrated in FIG. 7. Once inner tube 3 is elevated into its uppermost position, stripping off of net (b) from the processed goods will be virtually complete. Thereafter, inner tube 3 is moved downwardly to retreat or be withdrawn into outer tube 4, and meat net (b) is taken off of engaging claw member 7a so that it will be ready for the next operation.

Thus, in accordance with the present invention, the meat net is stripped away from the secondarily processed meat goods in such a fashion that any secondarily process meat goods covered with a meat net can be placed into the inner tube, such that the open end of the meat net will be brought into engagement with the engaging means on the outer tube. Thereafter, inner tube 3 will be moved outwardly so that it will project beyond the opening edge of the outer tube. As a result, the meat net can be stripped off in such a good condition that no external force need be applied to the secondary processed goods. Further, the stripping force is exerted uniformly along the radially outward direction, such that a stripping operation can be effected smoothly and will not spoil the secondarily processed meat goods in any fashion, thereby resulting in a satisfactory product.

It should be clear that alternate embodiments, details and features of the claimed invention are considered to be within the scope of this patent, as defined by the claims which are appended thereto.

What is claimed is:

1. An apparatus for stripping a meat net away from a packaged meat product surrounded by said net, said apparatus comprising a base body having at least one inner tube and at least one outer tube positioned thereon, said inner tube comprising means for retaining a processed meat product covered by said meat net, said outer tube being attached to said base body and including an outer circumferential open edge, said outer tube edge including means for selectively engaging an open end portion of said net, said inner tube being mounted within said outer tube and being movable outwardly and inwardly with respect to said outer tube through said outer edge of said outer tube.

2. Apparatus in accordance with claim 1, said meat net engaging means comprising a plurality of claw members which are attached to said outer circumferential opening edge of said outer tube, said claw members being arranged radially with respect to said opening edge.

3. Apparatus in accordance with claim 2, wherein each of said claw members includes a base end, each said base end being mounted within generally radially directed recesses in an annular cover attached to said outer tube edge.

4. Apparatus in accordance with claim 3 wherein each of said claw members are swingably supported on an annular engaging pin which is retained within said annular cover.

5. Apparatus in accordance with claim 3, wherein each of said claw members further comprises means for selectively contacting said base end of each of said claw members with an outer circumferential surface of said inner tube when said inner tube is moved outwardly from said outer tube.

6. Apparatus in accordance with claim 1, said meat net engaging means comprising a flange on said outer circumferential opening edge of said outer tube and a band which is detachably mounted about said flange and which comprises means for fastening one end of said meat net to said flange.

7. Apparatus for stripping a net away from a meat product covered by said net, said apparatus comprising:
    (a) a base support having a plurality of walls;
    (b) at least one pair of concentric tubes attached to said walls, said pair of tubes comprising an inner tube and an outer tube; and
    (c) means for engaging one end of said net, said net engaging means being attached to a peripheral portion of said outer tube.

8. Apparatus in accordance with claim 7, wherein said outer tube has first and second open ends and a cap attached to said first open end of said outer tube.

9. Apparatus in accordance with claim 8, wherein said cap includes a plurality of radially arranged recesses.

10. Apparatus in accordance with claim 9, further comprising a plurality of claws positioned in said plurality of recesses.

11. Apparatus in accordance with claim 10, wherein said cap comprises spaced apart, generally annular outer and inner wall portions, and wherein an annular ring is positioned between said inner and outer portions, each of said claws being pivotably positioned on said annular ring.

12. Apparatus in accordance with claim 11, wherein each of said claws includes a slot which is adapted to be slidably supported on said annular ring.

13. Apparatus in accordance with claim 12, wherein each of said claw member includes a base portion which is adapted to selectively contact an outer surface of said inner tube when said inner tube is moved outwardly through said first end of said inner tube.

14. Apparatus in accordance with claim 9, wherein each of said claws extends radially outwardly from respective ones of said recesses.

15. Apparatus in accordance with claim 7, wherein said inner tube is longer than said outer tube and is slidably positioned within said outer tube.

16. Apparatus in accordance with claim 15, wherein said inner tube has an open first end and a closed second end.

17. Apparatus in accordance with claim 7, wherein said inner and outer tubes are positioned vertically within an aperture in an upper wall of said base support.

18. Apparatus in accordance with claim 7, wherein said outer tube has an outer peripheral portion and wherein a flange is positioned in a substantially horizontal fashion about said outer peripheral portion, said flange being adapted to rest on an upper surface of said base support.

19. Apparatus in accordance with claim 7, wherein said base support includes a plurality of casters attached to a bottom wall of said base support.

20. Apparatus in accordance with claim 7, wherein said engaging means comprising a plurality of pivotable claws attached to one end of said outer tube, said inner tube including an outer circumferential surface which comprises means for limiting pivotable movement of said claws.

21. Apparatus in accordance with claim 7, wherein said inner tube has first and second ends, said second end being closed, said apparatus further comprising a cylinder attached to said closed end of said inner tube and comprising means for slidably driving said inner tube within said outer tube.

22. Apparatus in accordance with claim 21, further comprising an electromagnetic changeover valve for operating said cylinder.

23. Apparatus in accordance with claim 22, further comprising a changeover switch for operating said electromagnetic valve.

24. Apparatus in accordance with claim 21, wherein said outer tube includes a first open end and a second open end, said apparatus further comprising an elastic band which is adapted to be positioned over an outer flange on said outer tube, said elastic band comprising means for engaging a portion of said meat net positioned over said flange.

25. A method of stripping a net from a secondary meat product surrounded by a net, said method comprising:
(a) positioning a meat product surrounded by said net within a first, inner tube having one closed end for supporting said meat product and said net;
(b) attaching a first end of said meat net to an engaging device on an open end of a second, outer tube within which said inner tube is slidably positioned; and
(c) moving said inner tube through said outer tube while retaining said first end of said meat net with said engaging means.

26. A method in accordance with claim 25, further comprising pushing said inner tube through said outer tube until said net is at least substantially separated from said meat products.

27. A method in accordance with claim 26, further comprising pushing said inner tube by using a cylinder.

28. A method according to claim 25, further comprising completely pushing said inner tube through said outer tube.

29. A method according to claim 25 further comprising removing said meat product from said net, and returning said inner tube to a position within said outer tube for receiving a second meat product wrapped within a net.

* * * * *

UNITED STATES PATENT AND TRADEMARK OFFICE
CERTIFICATE OF CORRECTION

PATENT NO. : 4,773,203
DATED : September 27, 1988
INVENTOR(S) : Yoshihiko YAMAGUCHI It is certified that error appears in the above-identified patent and that said Letters Patent is hereby corrected as shown below:

In the Abstract, line 3, change "process" to ---processed---.

At column 1, line 8, change "secondary" to ---secondarily---.

At column 1, line 14, change "secondary" to ---secondarily---.

At column 1, lines 32-33, change "produce" to ---product.

At column 2, line 14, insert ---,--- after "walls".

At column 2, line 17, delete "a" after "has".

At column 2, line 51, change "include" to ---includes---.

At column 2, line 61, change "include" to ---includes---.

At column 3, lines 10-11, change "substantailly" to ---substantially---.

At column 4, line 12, change "memberds" to ---members---.

UNITED STATES PATENT AND TRADEMARK OFFICE
CERTIFICATE OF CORRECTION

PATENT NO. : 4,773,203

DATED : September 27, 1988

INVENTOR(S) : Yoshihiko YAMAGUCHI

It is certified that error appears in the above-identified patent and that said Letters Patent is hereby corrected as shown below:

At column 4, line 48, change "member" to --members--.

At column 4, line 67, change "secondary" to --secondarily--.

At column 5, line 26, change "process" to --processed--.

At column 5, lines 33-34, change "secondary" to --secondarily--.

At column 6, line 46, change "member" to --members--.

Signed and Sealed this

Eleventh Day of July, 1989

Attest:

DONALD J. QUIGG

Attesting Officer

Commissioner of Patents and Trademarks